(12) United States Patent
Konduru et al.

(10) Patent No.: US 12,067,026 B2
(45) Date of Patent: Aug. 20, 2024

(54) IN-MEMORY DATABASES FOR INTEGRATION TESTING OF EXTRACTION, TRANSFORMATION, AND/OR LOADING JOBS

(71) Applicant: Capital One Services, LLC, McLean, VA (US)

(72) Inventors: Anil Konduru, Plano, TX (US); Amit Ramesh Deshpande, McKinney, TX (US); Dillon Forsberg, Aubrey, TX (US); Anvitha Banakal Sadananda, Lewisville, TX (US); Jameskutty Mony, Lewisville, TX (US)

(73) Assignee: Capital One Services, LLC, McLean, VA (US)

( * ) Notice: Subject to any disclaimer, the term of this patent is extended or adjusted under 35 U.S.C. 154(b) by 5 days.

(21) Appl. No.: 17/891,554

(22) Filed: Aug. 19, 2022

(65) Prior Publication Data

US 2024/0061853 A1 Feb. 22, 2024

(51) Int. Cl.
*G06F 16/25* (2019.01)
*G06F 11/36* (2006.01)
*G06F 16/27* (2019.01)

(52) U.S. Cl.
CPC ........ *G06F 16/254* (2019.01); *G06F 11/3684* (2013.01); *G06F 16/27* (2019.01)

(58) Field of Classification Search
None
See application file for complete search history.

(56) References Cited

U.S. PATENT DOCUMENTS

| | | | |
|---|---|---|---|
| 7,596,748 B2 * | 9/2009 | Raghavachari | G06F 40/226 |
| | | | 715/239 |
| 10,275,234 B2 | 4/2019 | Belyy et al. | |
| (Continued) | | | |

FOREIGN PATENT DOCUMENTS

| | | |
|---|---|---|
| CN | 110059133 A | 7/2019 |
| CN | 110570255 A | 12/2019 |
| CN | 112732686 A | 4/2021 |

OTHER PUBLICATIONS

Mandrioli, Claudio. "Modeling and verification of big data computation." Dipartimento di Elettronica, Informazione e Bioingegneria Via Ponzio 34/5 20100 Milano Italy (Year: 2017).*

(Continued)

*Primary Examiner* — Uyen T Le
(74) *Attorney, Agent, or Firm* — Banner & Witcoff, Ltd.

(57) ABSTRACT

A method, apparatus, and computer-readable medium are described that provide integrated testing and validation of multi-phase instructions before deployment. Aspects of the disclosure relate to testing ETL instructions using an efficient process that individually and/or holistically validates the ETL instructions and, using a random number generator, varies various aspects of the source datasets. A benefit of running the combination of instructions includes finding errors that are not apparent during testing of each instruction phase separately. Instructions may be separately provided that identify the framework of an in-memory source dataset (e.g., a quantity of rows, a quantity of columns, types of the various columns, data for each record, and the like). The instructions for the framework may also identify a variability of one or more of the items of the framework.

20 Claims, 5 Drawing Sheets

(56) References Cited

U.S. PATENT DOCUMENTS

| | | | |
|---|---|---|---|
| 2005/0243604 A1* | 11/2005 | Harken | G06F 8/51 |
| | | | 365/185.22 |
| 2005/0256892 A1* | 11/2005 | Harken | G06Q 10/10 |
| 2022/0222266 A1* | 7/2022 | Makumbi | G06F 16/254 |
| 2022/0374442 A1* | 11/2022 | Kaspa | G06F 16/26 |

OTHER PUBLICATIONS

Pareek A, Khaladkar B, Sen R, Onat B, Nadimpalli V, Lakshminarayanan M. Real-time ETL in Striim. InProceedings of the international workshop on real-time business intelligence and analytics Aug. 27, 2018 (pp. 1-10). (Year: 2018).*

* cited by examiner

IN-MEMORY DATABASES FOR INTEGRATION TESTING OF EXTRACTION, TRANSFORMATION, AND/OR LOADING JOBS

TECHNOLOGICAL FIELD

Aspects of the disclosure relate generally to testing database-related instructions.

BACKGROUND

Instructions to obtain data from existing databases, clean and sanitize the data, then load it into a data warehouse or other container are commonly parsed into three phases: extraction, transform, and load (ETL) jobs. Deploying ETL jobs, without testing, can lead to erroneous data as well as wasted processing time. To minimize the chance of either of these occurring, developers are expected to test data warehouse creation instructions extensively before implementation. Developers test ETL instructions based on their experiences and/or on existing test datasets. Because their experiences cannot cover all situations and unknown variations may occur in actual datasets not found in their test datasets, testing using these approaches may fail to find flaws in the ETL instructions.

SUMMARY

The following presents a simplified summary of various aspects described herein. This summary is not an extensive overview, and is not intended to identify key or critical elements or to delineate the scope of the claims. The following summary merely presents some concepts in a simplified form as an introductory prelude to the more detailed description provided below.

Aspects of the disclosure relate to testing ETL instructions using an efficient process that individually and/or holistically validates the ETL instructions and, using a random number generator, varies various aspects of the source datasets. By instantiating the source datasets as in-memory datasets (e.g., in a memory of a computing system), testing the ETL instructions on the in-memory source datasets, varying aspects of the in-memory source datasets, and retesting the ETL instructions, errors in individual extraction, transform, or load instructions may be found. Additionally or alternatively, errors may be found by running combinations of the extraction and transform and/or the extraction, transform, and load instructions together. A benefit of running the combination of instructions includes finding errors that are not apparent during testing of each instruction phase separately. Aspects of the disclosure may also be applied to extraction, load, and transform (ELT) jobs.

Some implementations described herein relate to a computer-implemented method for testing instructions on a test database. The method may comprise receiving, from a storage, first database instructions including first extraction instructions configured to extract source content, first transform instructions configured to transform the extracted source content, and first load instructions configured to load the transformed source content as target content. The method may include generating, in a memory of a computing system, a source database framework and a target database framework and receiving first test information, wherein the first test information describes source database content and variability of the source database content. The method may include generating a source database with records and fields where the source database is generated based on the source database framework, the first test information, and a random number generator. Further, the method may include generating a target database comprising target records and target fields and be based on the source database, the first database instructions, and the target database framework. The method may further include validating at least a portion of the target database against a corresponding portion of the source database and generating a modified source database that is based on a successful validation of the at least the portion of the target database against the corresponding portion of the source database, the variability of the source database content, and the random number generator. Further, the source database and the modified source database may differ in at least one of records or fields.

In additional aspects, the source database may differ from the modified source database in quantities of records, values in respective records, quantities of fields, and/or types of fields. Further, the validating may include comparing a quantity of the first records of the source database with a quantity of target records of the target database such that generating the modified source database may be further based on the comparison of the quantity of the first records of the source database with a quantity of target records of the target database.

Further, the validating may include comparing values between a selected field of a record of the first records of the source database with a corresponding field of a corresponding record of the target records of the target database such that generating the modified source database is further based on the comparison of the selected field and the corresponding field. In further aspects, at least a second portion of the target database may be validated against a corresponding second portion of the source database. Also, the method may include generating, based on a failed validation of the at least the second portion of the target database against the corresponding second portion of the source database, an indication of the failed validation. In response, modified first extraction instructions may be received based on the failed validation from a user.

The method may further include outputting the indication of the failed validation with the at least the second portion of the target database and the corresponding second portion of the source database. Alternatively, the method may further include generating a modified target database comprising modified target records and modified target fields as based on the modified source database, the first database instructions, and target database framework. The method may further include validating at least a portion of the modified target database against a corresponding portion of the modified source database and outputting a result of a validation of the at least the portion of the modified target database against the corresponding portion of the modified source database.

Additional aspects, configurations, embodiments, and examples are described in more detail below.

BRIEF DESCRIPTION OF THE SEVERAL VIEWS OF THE DRAWINGS

The present disclosure is illustrated by way of example and not limited in the accompanying figures in which like reference numerals indicate similar elements and in which.

Figure 1:
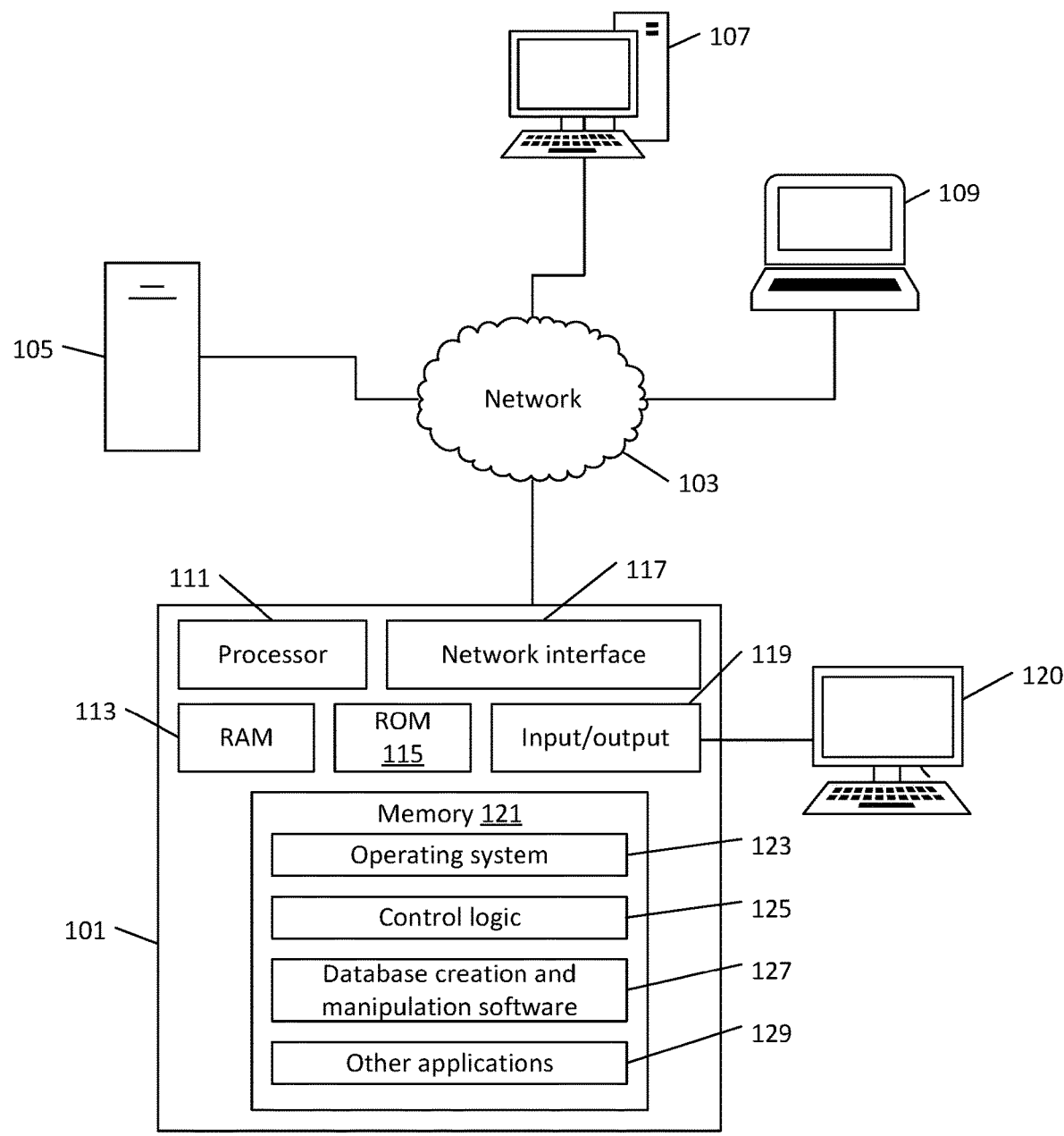
FIG. 1 depicts an example of a computing device and system architecture that may be used in implementing one or more aspects of the disclosure in accordance with one or more illustrative aspects discussed herein.

It will be recognized by the skilled person in the art, given the benefit of this disclosure, that the exact arrangement, sizes and positioning of the components in the figures is not necessarily to scale or required.

DETAILED DESCRIPTION

Certain aspects relate to improving how multi-phase instructions are validated before deployment. Through testing the combination of different phases of instructions, the robustness of an ETL solution may be improved. Aspects of the disclosure relate to testing ETL instructions using an efficient process that individually and/or holistically validates the ETL instructions and, using a random number generator, varies various aspects of the source datasets. By instantiating the source datasets as in-memory datasets (e.g., in a memory of a computing system), testing the ETL instructions on the in-memory source datasets, varying aspects of the in-memory source datasets, and retesting the ETL instructions, errors in individual extraction, transform, or load instructions may be found. Additionally or alternatively, errors may be found by running combinations of the extraction and transform and/or the extraction, transform, and load instructions together. A benefit of running the combination of instructions includes finding errors that are not apparent during testing of each instruction phase separately. Instructions may be separately provided that identify the framework of an in-memory source dataset (e.g., a quantity of rows, a quantity of columns, types of the various columns, data for each record, and the like). The instructions for the framework may also identify a variability of one or more of the items of the framework. For instance, the quantity of rows may vary, the types of columns may vary, the quantity of columns may vary, and the like. The variability of the framework instructions may be specified as a range of values such that a random number generated by the random number generator may be assigned to a bin for the framework instructions and the value associated with the bin provided as the framework instructions for a given instance of an in-memory source dataset. The framework of the in-memory source dataset may be populated using the random number generator and/or may pull values from yet another dataset. By using the random number generator to vary the in-memory source dataset between testing iterations, better testing of the individual extraction, transform, and load instructions may be performed as well as better integrated testing of the ETL instructions may performed (where the extraction and transform instructions or extraction, transform, and load instructions are tested as a set). The target dataset may be validated against one or more aspects of records or fields from the in-memory source dataset. Based on a successful validation, the framework of the in-memory source dataset may be varied and the in-memory source dataset regenerated using the new framework. Aspects of the disclosure may also be applied to extraction, load, and transform (ELT) jobs. For simplicity, the following description refers to ETL jobs. It is appreciated that the disclosure similarly encompasses ELT jobs.

In the following description of the various embodiments, reference is made to the accompanying drawings, which form a part hereof, and in which is shown by way of illustration various embodiments in which aspects of the disclosure may be practiced. It is to be understood that other embodiments may be utilized and structural and functional modifications may be made without departing from the scope of the present disclosure. Aspects of the disclosure are capable of other embodiments and of being practiced or being carried out in various ways. Also, it is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. Any sequence of computer-implementable instructions described in this disclosure may be considered to be an "algorithm" as those instructions are intended to solve one or more classes of problems or to perform one or more computations. While various directional arrows are shown in the figures of this disclosure, the directional arrows are not intended to be limiting to the extent that bi-directional communications are excluded. Rather, the directional arrows are to show a general flow of steps and not the unidirectional movement of information. In the entire specification, when an element is referred to as "comprising" or "including" another element, the element should not be understood as excluding other elements so long as there is no special conflicting description, and the element may include at least one other element. In addition, the terms "unit" and "module", for example, may refer to a component that exerts at least one function or operation, and may be realized in hardware or software, or may be realized by combination of hardware and software. In addition, terms such as " . . . unit", " . . . module" described in the specification mean a unit for performing at least one function or operation, which may be implemented as hardware or software, or as a combination of hardware and software. Throughout the specification, expression "at least one of a, b, and c" may include 'a only', 'b only', 'c only', 'a and b', 'a and c', 'b and c', and/or 'all of a, b, and c'.

Before discussing the concepts of the disclosure in greater detail, however, several examples of a computing device that may be used in implementing and/or otherwise providing various aspects of the disclosure will first be discussed with respect to FIG. 1. FIG. 1 illustrates one example of a computing device 101 that may be used to implement one or more illustrative aspects discussed herein. For example, the computing device 101 may, in some embodiments, implement one or more aspects of the disclosure by reading and/or executing instructions and performing one or more actions based on the instructions. In some embodiments, the computing device 101 may represent, be incorporated in, and/or include various devices such as a desktop computer, a computer server, a mobile device (e.g., a laptop computer, a tablet computer, a smart phone, any other types of mobile computing devices, and the like), and/or any other type of data processing device.

The computing device 101 may, in some embodiments, operate in a standalone environment. In others, the computing device 101 may operate in a networked environment. As shown in FIG. 1, various network nodes 101, 105, 107, and 109 may be interconnected via a network 103, such as the Internet. Other networks may also or alternatively be used, including private intranets, corporate networks, LANs, wireless networks, personal networks (PAN), and the like. Network 103 is for illustration purposes and may be replaced with fewer or additional computer networks. A local area network (LAN) may have one or more of any known LAN topologies and may use one or more of a variety of different protocols, such as Ethernet. Devices 101, 105, 107, 109, and other devices (not shown) may be connected to one or more of the networks via twisted pair wires, coaxial cable, fiber optics, radio waves, or other communication media. Additionally or alternatively, the computing device 101 and/or the network nodes 105, 107, and 109 may be a server hosting one or more databases.

As seen in FIG. 1, the computing device 101 may include a processor 111, RAM 113, ROM 115, network interface 117, input/output interfaces 119 (e.g., keyboard, mouse, display, printer, etc.), and memory 121. Processor 111 may include one or more computer processing units (CPUs), graphical processing units (GPUs), and/or other processing units such as a processor adapted to perform computations associated with database operations. Input/output 119 may include a variety of interface units and drives for reading, writing, displaying, and/or printing data or files. Input/output 119 may be coupled with a display such as display 120. Memory 121 may store software for configuring computing device 101 into a special purpose computing device in order to perform one or more of the various functions discussed herein. Memory 121 may store operating system software 123 for controlling overall operation of the computing device 101, control logic 125 for instructing the computing device 101 to perform aspects discussed herein, database creation and manipulation software 127 and other applications 129. Control logic 125 may be incorporated in and may be a part of database creation and manipulation software 127. In other embodiments, the computing device 101 may include two or more of any and/or all of these components (e.g., two or more processors, two or more memories, etc.) and/or other components and/or subsystems not illustrated here.

Devices 105, 107, 109 may have similar or different architecture as described with respect to the computing device 101. Those of skill in the art will appreciate that the functionality of the computing device 101 (or device 105, 107, 109) as described herein may be spread across multiple data processing devices, for example, to distribute processing load across multiple computers, to segregate transactions based on geographic location, user access level, quality of service (QoS), etc. For example, devices 101, 105, 107, 109, and others may operate in concert to provide parallel computing features in support of the operation of control logic 125 and/or software 127.

One or more aspects discussed herein may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) Python, JavaScript, or an equivalent thereof. The computer executable instructions may be stored on a computer readable medium such as a hard disk, optical disk, removable storage media, solid-state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects discussed herein, and such data structures are contemplated within the scope of computer executable instructions and computer-usable data described herein. Various aspects discussed herein may be embodied as a method, a computing device, a data processing system, or a computer program product. Having discussed several examples of computing devices which may be used to implement some aspects as discussed further below, discussion will now turn to a method for classifying textual data using a machine-learning classifier.

Figure 2:
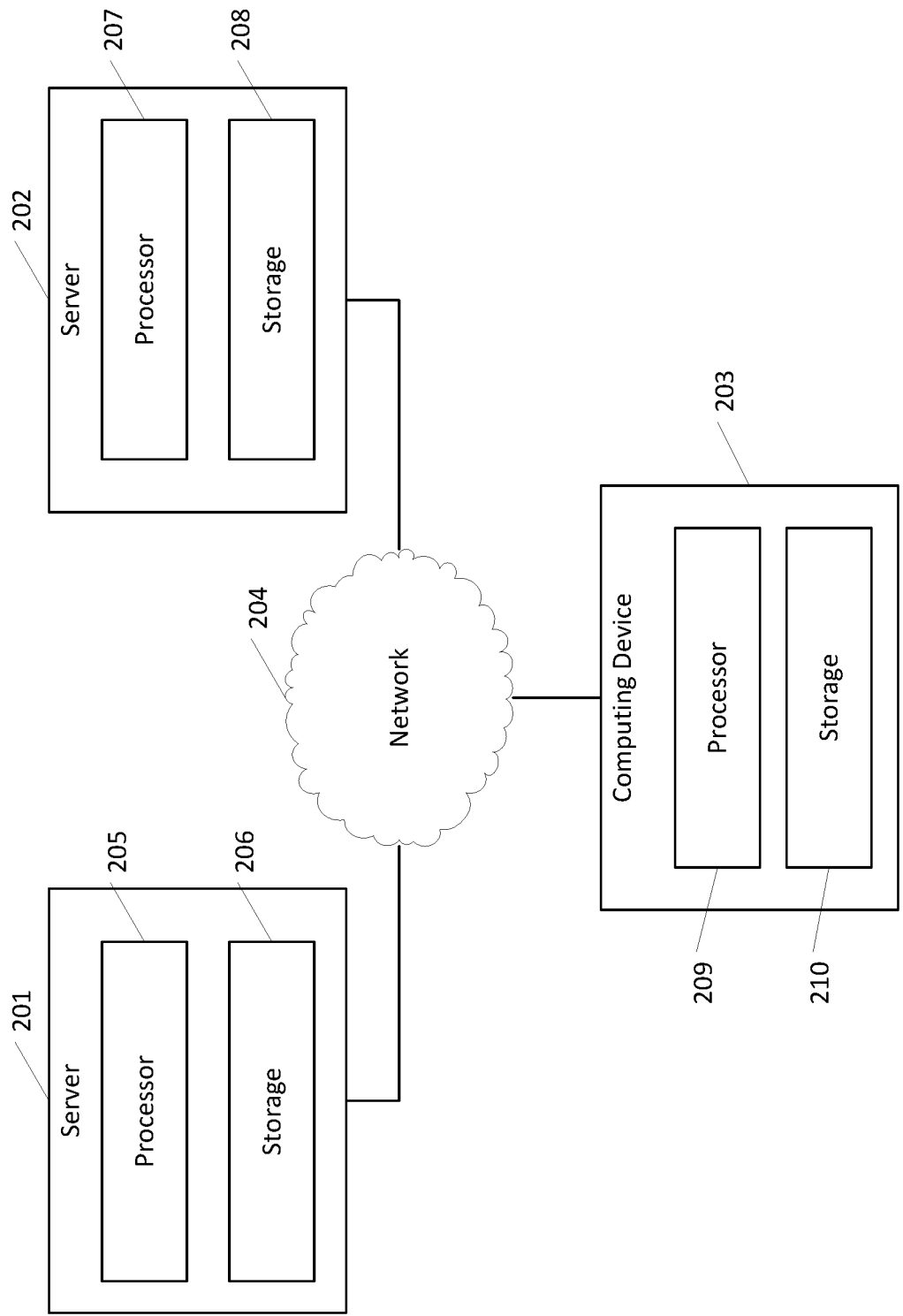
FIG. 2 depicts a block diagram of an environment in which systems and/or methods described herein may be implemented.

FIG. 2 is a block diagram of an environment in which systems and/or methods described herein may be implemented. As shown in FIG. 2, the environment may include servers 201 and 202 and a computing device 203 connected by a network 204. The devices, servers, and network may be interconnected via wired connections, wireless connections, or a combination of wired and wireless connections. The server 201 may be directed toward receiving files relating to activities from computing device 203 and then sending the files to server 202 for processing.

The network 204 may include one or more wired and/or wireless networks. For example, network 204 may include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more servers shown in FIG. 2 may be implemented within a single server, or a single server shown in FIG. 2 may be implemented as multiple, distributed servers or in a cloud-based computing environment. Additionally or alternatively, a set of devices (e.g., one or more devices) of the environment 203 may perform one or more functions described as being performed by another set of devices of the environment. Network 204 may be represented as a single network but may comprise combinations of other networks or subnetworks. In one or more examples, ETL instructions may be crafted by a developer operating the computing device 203 and stored in storage 210. A framework for an in-memory source database may be stored in storage 206 of server 201. Based on variability information of the framework (e.g., stored with the framework in storage 206, separate from server 201 and stored in storage 208 of server 202, and/or provided by the developer using computing device 203), the in-memory source dataset may be generated using a random number generator (e.g., implemented in any of processors 205, 207, 209, or elsewhere) and the in-memory source dataset stored (e.g., remotely in storage 206 and/or in storage 208 or locally in the storage 210 or in the memory 121 of computing device 101). The developer may then test the ETL instructions on the in-memory source dataset. The results may be stored in a target dataset and target records compared against corresponding source records and/or fields. Based on a successful validation, the framework of the in-memory source dataset may be varied based on the variability information and the in-memory source dataset regenerated for further testing of the ETL instructions. Based on a failed validation, the developer may be alerted to the failure. The failed data may be identified with the corresponding instruction or instruction trace to permit the developer to modify the instructions.

To assist with explanation of the concepts described here, the disclosure includes the following sections: Testing Extraction, Transform, and Load Instructions using Databases with Variability and ETL Testing with Selectable Validation.

Figure 3:
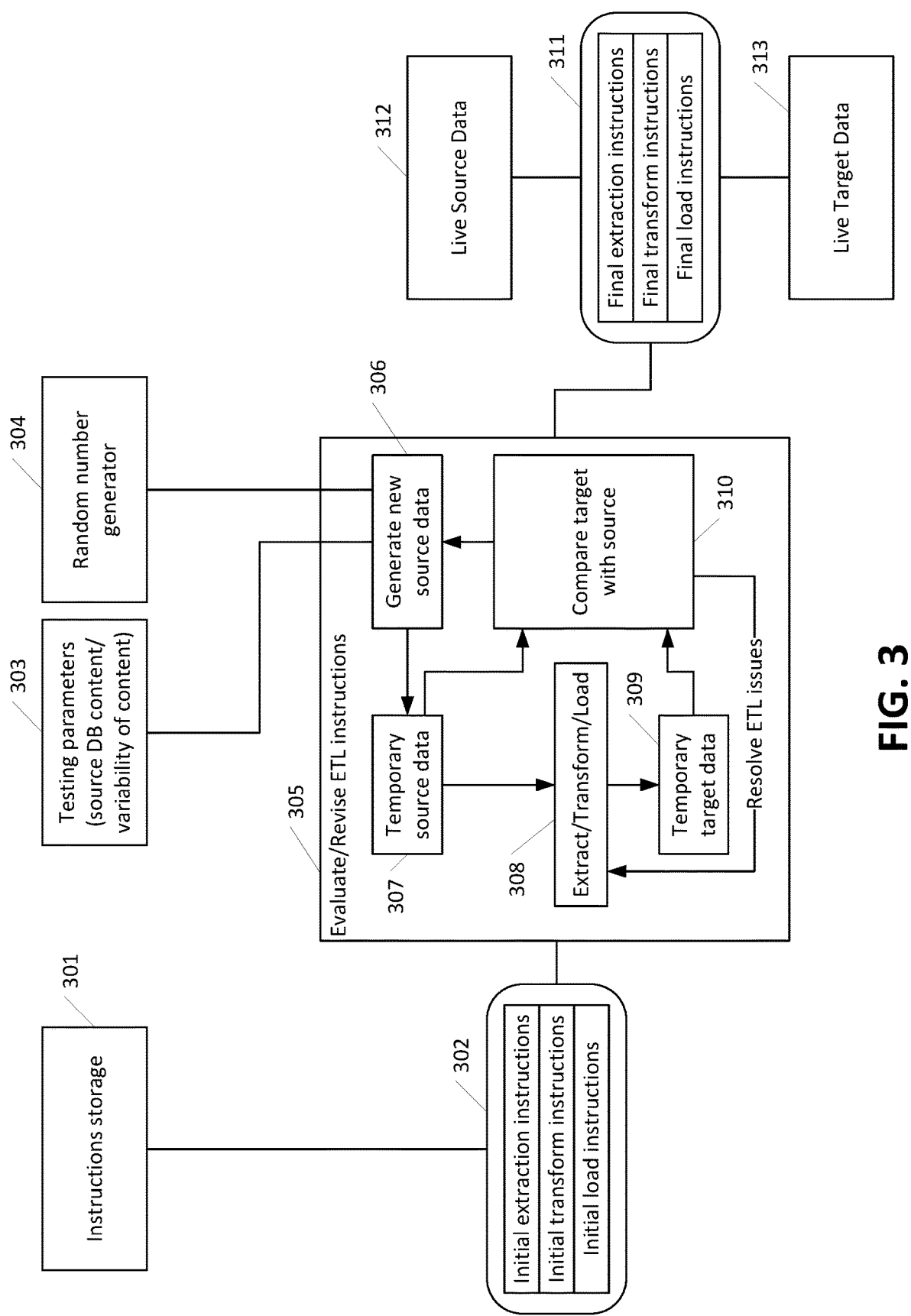
FIG. 3 depicts an example of evaluating extract, transform, and/or load instructions on temporary databases.

Testing Extraction, Transform, and Load Instructions Using Databases with Variability FIG. 3 depicts a sample functional relationship diagram showing ETL instructions being tested against a variable in-memory source dataset. Initial ETL instructions may be created and/or stored in instructions storage 301 (e.g., one or more of storages 206, 208, and/or 210 of FIG. 2). The ETL instructions 302 may be evaluated and, if needed, revised by process 305. The process 305 may receive testing parameters 303 comprising a source framework and/or variability of the source framework.

The source framework may include a sample database or sample dataset (collectively "sample data") and that sample data may be modified by a random number generator or may only specify characteristics of the source dataset (various fields to be generated—e.g., 5, 10, 20, etc. —and the types of content for those fields—e.g., general, date, date/time, decimal number, whole number, etc.). For instance, the source framework may comprise one or more containers implemented in memory. An example of a container may include a container from Testcontainers.org as implemented in JAVA™ of the Oracle Corporation of Austin, Texas.

As an example, the different lengths or types of fields may be represented as bins such that a random number from the random number generator may fall within a range of a given bin. For instance, for the types of fields, they may be assigned variably (for a random number between 0-1) as follows: general {0.000-0.199}, date {0.200-0.399}, date/time {0.400-0.449}, decimal number {0.450-0.499}, whole number {0.500-1.000}. Here, the whole number type of field is present about 50% of the time with the other field types occurring for the remaining 50% to various degrees. Other values may be selected based on the desired variability of each field. Other field types are available and selectable as desired.

The source data may be generated using the testing parameters 303 and the random number generator 304 (or retrieved if already existing) in process 306. The temporary source data 307 may be temporarily stored in a storage. The ETL instructions 302 may be executed in process 308 on the temporary source data 307 and the results stored as temporary target data 309. Process 310 may compare various records of the temporary target data 309 with corresponding records from the temporary source data 307. If the records of the resulting temporary target data 309 are the expected results of the records of the temporary source data 307 as processed by the ETL instructions 302 in process 308, then the ETL instructions 302 may be considered validated for that temporary source data and new source data generated in process 306.

If the records of the resulting temporary target data 309 differ from expected results of the records of the temporary source data 307 as processed by the ETL instructions 302 in process 308, then the developer may be alerted that the records of the temporary target data 309 did not validate against the corresponding records of the temporary source data 307 considering the ETL modifications of process 308. For instance, if the temporary source data include a field labeled "Account Balance" having a general field type and values including numbers and spaces and the implementation of the ETL instructions 302 in process 308 push the data into an "Account Balance" field of a decimal number field type, the expected resulting records in the temporary target data 309 may include only the numerical values from the source records in the "Account Balance" field. If records of the temporary target data 309 in the "Account Balance" field contain the expected numbers with no spaces, then, at least for those records, the ETL instructions 302 implemented by the process 308 validated correctly. Alternatively, if records of the temporary target data 309 in the "Account Balance" field contain the expected numbers but also include spaces, then, at least for those records, the ETL instructions implemented by the process 308 did not validate correctly.

Where the ETL instructions 302 did not validate correctly in process 308, the developer may be prompted to provide new ETL instructions 302 that attempt to resolve the ETL issues with the previous ETL instructions 302. The ETL instructions 302 implemented in process 308 may be repeated and records of the resulting temporary target data 309 validated against corresponding records of the temporary source data 307. When the ETL instructions 302 evaluated in process 308 consistently validate, the ETL instructions 302 may be deployed as final ETL instructions 311 (e.g., final extraction instructions, final transform instructions, and final load instructions). The final ETL instructions 311 may be used to extract, transform, and load live source data 312 (e.g., from a deployed container or storage—e.g., storage 206 or storage 208) and output the resulting data as live target data 313 (e.g., to a deployed container or storage—e.g., storage 206 or storage 208).

ETL Testing with Selectable Validation

One or more aspects include testing the ETL instructions by comparing a target dataset, generated from executing the ETL instructions on a source dataset, with the source dataset. Based on results of the comparison, e.g., comparing various aspects of the source and target datasets, additional target datasets may be generated for additional testing of the ETL instructions. After sufficient testing using multiple source datasets, the ETL instructions may be ready for deployment for processing live source datasets. The creation of the source datasets may be based on probability distributions associated with various aspects of the source datasets. The probability distributions may be sampled by a random number generator and the resulting output used to form a portion of the source dataset. For example, the source dataset may be described as comprising a source record quantity variability, a source field quantity variability, source field type variability, or source record values variability, or a combination of two or more of these variabilities. The source record quantity variability may comprise a description of quantities of records and associated likelihoods of record quantity occurrences, where the likelihoods of record quantity occurrences may be a first probability distribution. The source field quantity variability may comprise a description of quantities of fields and associated likelihoods of field quantity occurrences, where the likelihoods of field quantity occurrences may be a second probability distribution. The source field type variability may comprise a description of field types and associated likelihoods of field type occurrences, where the likelihoods of field type occurrences is a third probability distribution. The source record values variability may comprise a description of record content (length, values) and associated likelihoods of length/value occurrences, where the likelihoods of length/value occurrences may be a fourth probability distribution.

The source content may be generated using a computing device that controls a random number generator to sample one or more of the probability distributions. The results of sampling the probability distributions may be combined to form the in-memory source database. For example, the computing device may control the random number generator to sample the first probability distribution to obtain a source record count representing a quantity of records to appear in the in-memory source database. The computing device may control the random number generator to sample the second probability distribution to obtain a source field count representing a quantity of fields to appear for each record in the in-memory source database. The computing device may control the random number generator to sample the third probability distribution to obtain a field type of each source field. The computing device may control the random number generator to sample the fourth probability distribution to obtain record content for each field of each record. Based on the source record count, the quantity of fields, the field type of each field, and the record content for each field of each record, the computing device may generate the in-memory source database. To generate a new in-memory source database and/or a modified in-memory source database, one or more of the probability distributions may be sampled again and the result of the new sampling be used to generate the new or modified in-memory source database.

Figure 4:
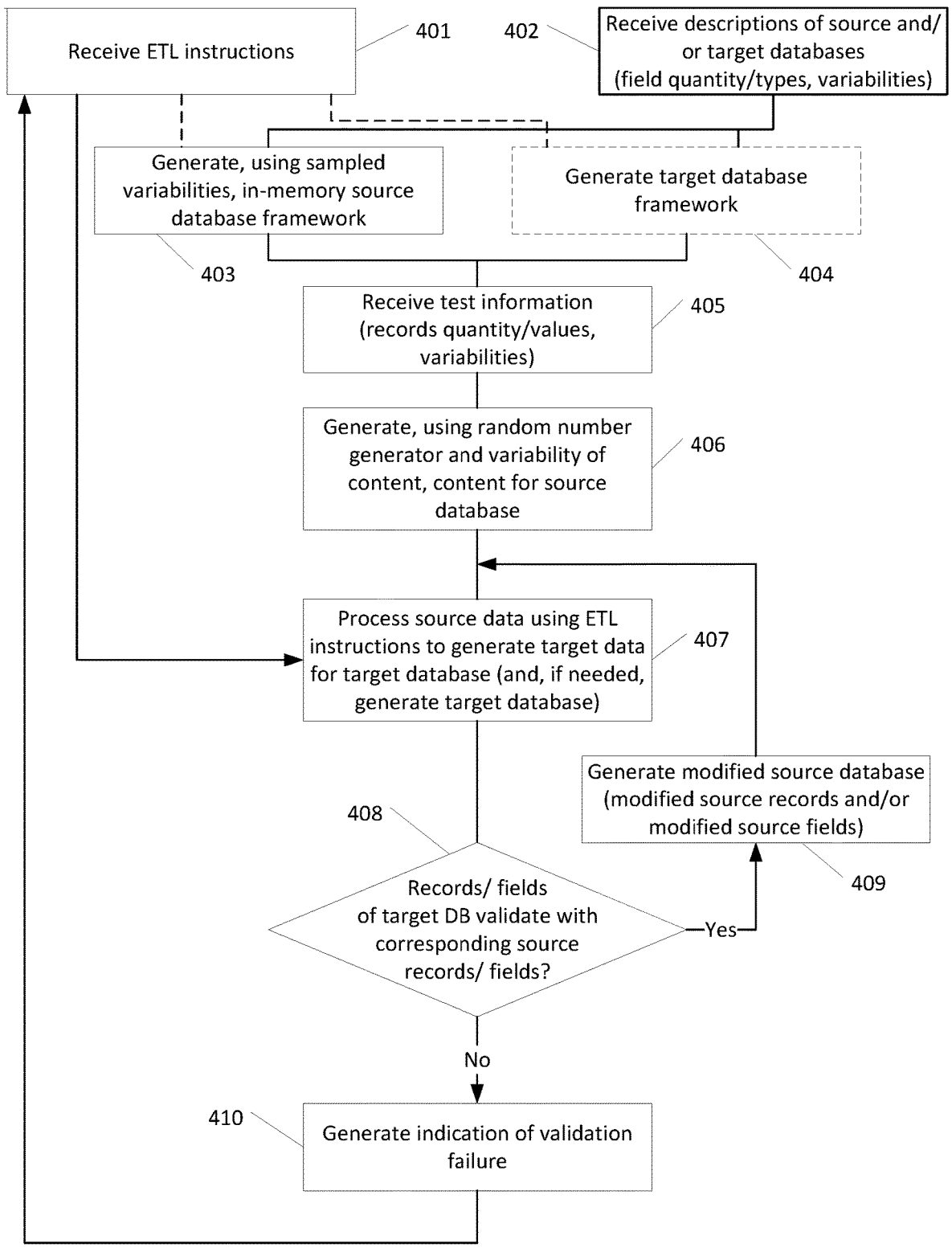
FIG. 4 shows a flowchart of a process for evaluating extract, transform, and/or load instructions.

In some examples, the in-memory source database may be generated at one time. Additionally or alternatively, the in-memory source database may be generated in phases, e.g., generating a framework of a quantity of fields and types of the fields and subsequently generating a quantity of rows and content for each row. FIG. 4 describes a process for generating the framework separate from generating the rows and content for each row. However, it is appreciated that generating the framework and content for the framework may be generated together.

FIG. 4 shows a flowchart of a process for evaluating extract, transform, and/or load (ETL) instructions. In step 401, ETL instructions may be received from, for example, a storage on a developer's computing device. In step 402, descriptions of the source and/or target databases may be received. For example, the descriptions of the source and/or target databases may comprise a probability distribution of a quantity of fields for the database or databases and/or a probability distribution of the types of fields in the database or databases. Based on the descriptions of the source and/or target databases, an in-memory source database framework may be generated in step 403 by sampling the probability distributions with a random number generator. If desired, an in-memory target database framework may also be generated in step 404 based on the received descriptions of step 402 and the sampling of the probability distributions, by the random number generator, of step 402. In step 405, test information describing the source content (e.g., the record content) and/or variability of the source content may be received. In step 406, row content for the in-memory source database may be generated using the test information received in step 405 and sampled by the random number generator. In step 407, the content of the in-memory source database may be processed using the ETL instructions received in step 401. The output may be used to populate the target database framework. If the target database framework does not exist (e.g., step 404 being omitted), the ETL instructions may include the generation of the target database. If so, the processing of the in-memory source database in step 407 may also generate both the framework for the target database as well as the content for the target database.

In step 408, one or more records of the target database may be compared with corresponding records of the in-memory source database to determine whether the ETL instructions generated expected target data. If the ETL instructions validate successfully for the compared records, then in step 409 a modified in-memory source database with content may be generated, e.g., by sampling one or more of the probability distributions. If only new content is desired, the process of step 409 may use the random number generator and the probability distributions describing the variability of content received in step 405 to generate new content in the existing in-memory source database framework. If new content and a new in-memory source database framework is desired, the process of step 409 may use the random number generator and the probability distributions describing the variability of source fields (e.g., quantity and/or type) from step 402 and/or the probability distributions describing the variability of the source content from step 405 to generate a new in-memory source database framework and then populate the new in-memory source database framework with new content.

The ETL instructions may process, in step 407, the new content in the new in-memory source database and the resulting target data validated in step 408. If records of the target data did not validate against the corresponding records of the source data in step 408, then the process may generate, in step 410, an indication that the target data failed to validate. The developer may modify the ETL instructions and those modified ETL instructions may be received in step 401 and the process performed again.

Additionally or alternatively, the in-memory source database framework may be generated in step 403 based on the ETL instructions themselves or in combination with the received description of the in-memory source database from step 402. Additionally or alternatively, the target database framework may be generated in step 404 based on the ETL instructions themselves or in combination with the received description of the target database from step 402.

Figure 5:
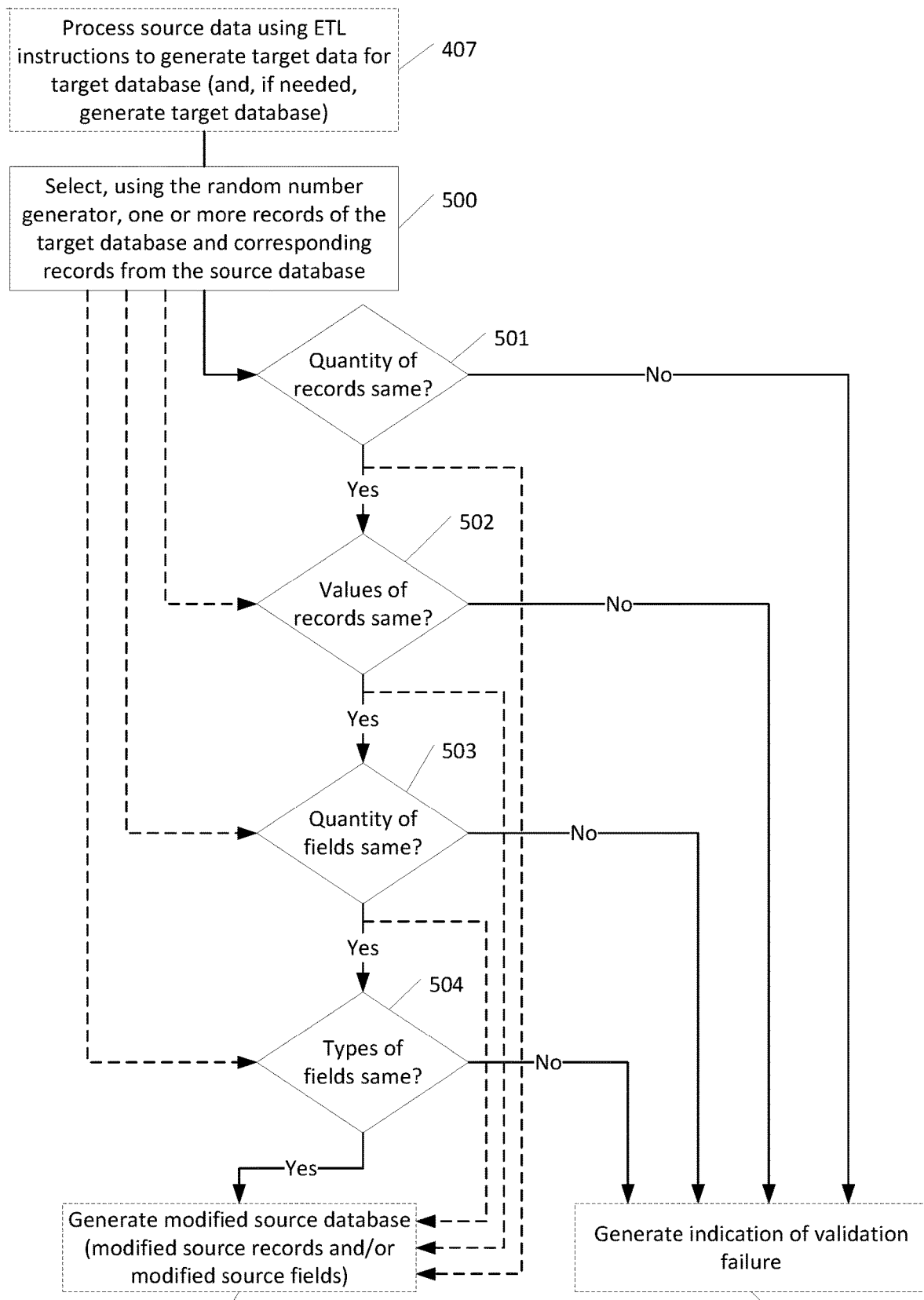
FIG. 5 shows a flowchart of a process of evaluating one or more aspects between source and target databases.

FIG. 5 shows a flowchart of a process of evaluating one or more aspects between source and target databases. Step 407 from FIG. 4 is shown as an optional starting point of the process of FIG. 5. Based on target data generated for a target database, one or more aspects of records of the target data may be compared to corresponding records of the source data. In step 500, specific records of the source or target database may be selected for comparison with corresponding records of the other database. For instance, the random number generator may be used to select one or more records of the target database. Based on the selection of the target records, corresponding records of the in-memory source database may be identified and used for comparison. For example, various comparisons are shown in steps 501-504. In step 501, the process determines whether a quantity of records is the same for the target data and the source data. If the quantity of records is not the same, then the process generates, in step 410, an indication that the validation has failed. If the quantity of records is the same, the process determines, in step 502, whether values in the records of the target data are the same as values in the records of the source data. If the values are not the same, then the process generates, in step 410, the indication that the validation has failed. If the values of the records are the same, the process determines, in step 503, whether a quantity of fields between the source and target databases are the same. If the quantity of fields is not the same, then the process generates, in step 410, the indication that the validation has failed. If the quantity of fields is the same, the process determines, in step 504, whether the types of fields of the source and target databases are the same. If the types of fields are not the same, then the process generates, in step 410, the indication that the validation has failed. If the types of fields are the same, then the process generates, in step 409, a modified in-memory source database comprising modified source records and possibly modified source fields and the validation process repeated as shown in FIG. 4. As shown in FIG. 5, steps 501-504 may be performed together. Additionally or alternatively, each of steps 501-504 may be performed individually or in any combination and/or order. Other validation steps may be added as desired.

In one or more aspects, a computer-implemented method for testing instructions on a test database may comprise receiving, from a storage, first database instructions including first extraction instructions configured to extract source content, first transform instructions configured to transform the extracted source content, and first load instructions configured to load the transformed source content as target content. The method may include generating, in a memory of a computing system, a source database framework and a target database framework and receiving first test information, wherein the first test information describes source database content and variability of the source database content. The method may include generating a source database with records and fields where the source database is generated based on the source database framework, the first test information, and a random number generator. Further, the method may include generating a target database comprising target records and target fields and be based on the source database, the first database instructions, and the target database framework. The method may further include validating at least a portion of the target database against a corresponding portion of the source database and generating a modified source database that is based on a successful validation of the at least the portion of the target database against the corresponding portion of the source database, the variability of the source database content, and the random number generator. Further, the source database and the modified source database may differ in at least one of records or fields.

In additional aspects, the source database may differ from the modified source database in quantities of records, values in respective records, quantities of fields, and/or types of fields. Further, the validating may include comparing a quantity of the first records of the source database with a quantity of target records of the target database such that generating the modified source database may be further based on the comparison of the quantity of the first records of the source database with a quantity of target records of the target database.

Further, the validating may include comparing values between a selected field of a record of the first records of the source database with a corresponding field of a corresponding record of the target records of the target database such that generating the modified source database is further based on the comparison of the selected field and the corresponding field.

In further aspects, at least a second portion of the target database may be validated against a corresponding second portion of the source database. Also, the method may include generating, based on a failed validation of the at least the second portion of the target database against the corresponding second portion of the source database, an indication of the failed validation. In response, modified first extraction instructions may be received based on the failed validation from a user.

The method may further include outputting the indication of the failed validation with the at least the second portion of the target database and the corresponding second portion of the source database. Alternatively, the method may further include generating a modified target database comprising modified target records and modified target fields as based on the modified source database, the first database instructions, and target database framework. The method may further include validating at least a portion of the modified target database against a corresponding portion of the modified source database and outputting a result of a validation of the at least the portion of the modified target database against the corresponding portion of the modified source database.

In one or more aspects, an apparatus may comprise one or more processors, and memory storing instructions that, when executed by the one or more processors, cause the apparatus to receive, from a storage, first database instructions comprising first extraction instructions configured to extract source content, first transform instructions configured to transform the extracted source content, and first load instructions configured to load the transformed source content as target content. The instructions may further cause the apparatus to generate, in a memory of a computing system, a source database framework and a target database framework; receive first test information, wherein the first test information describes source database content and variability of the source database content: and generate a source database. The source database may be based on the source database framework, the first test information, and a random number generator, and may further include records arranged in fields. The instructions may further cause the apparatus to generate a target database, having target records and target fields. The target database may be based on the source database, the first database instructions, and the target database framework. The instructions may further cause the apparatus to validate at least a portion of the target database against a corresponding portion of the source database and generate a modified source database, where the modified source database may be based on a successful validation of the at least the portion of the target database against the corresponding portion of the source database, the variability of the source database content, and the random number generator. The modified source database may include second records and second fields.

In one or more aspects, the source database may differ from the modified source database in quantities of records, values of respective records, quantities of fields, and/or types of fields. The instructions may further cause the apparatus to compare a quantity of the first records of the source database with a quantity of target records of the target database such that the generation the modified source database may be further based on the comparison of the quantity of the first records of the source database with a quantity of target records of the target database.

In further aspects, the instructions to validate may further cause the apparatus to compare values between a selected field of a record of the first records of the source database with a corresponding field of a corresponding record of the target records of the target database. In response, the modified source database may be generated based on the comparison of the selected field and the corresponding field.

In yet further aspects, the instructions may further cause the apparatus to validate at least a second portion of the target database against a corresponding second portion of the source database; generate, based on a failed validation of the at least the second portion of the target database against the corresponding second portion of the source database, an indication of the failed validation; and receive, based on the generation of the indication of the failed validation, modified first extraction instructions. The apparatus may then output the indication of the failed validation with the at least the second portion of the target database and the corresponding second portion of the source database.

In a further aspect, one or more non-transitory media may store instructions that, when executed by one or more processors, cause the one or more processors to perform steps including receiving, from a storage, first database instructions including first extraction instructions configured to extract source content, first transform instructions configured to transform the extracted source content, and first load instructions configured to load the transformed source content as target content. The instructions may cause the processors to perform further steps including generating, in a memory of a computing system, a source database framework and a target database framework; receiving first test information. For example, the first test information may describe a source database content including a quantity of records, a quantity and types of fields, and variability of the source database content. The instructions may cause the processors to perform further steps including generating a source database based on the source database framework, the first test information, and a random number generator, where the source database may include first records and first fields; generating a target database comprising target records and target fields based on the source database, the first database instructions, and the target database framework; validating at least a portion of the target database against a corresponding portion of the source database; generating a modified source database based on a successful validation of the at least the portion of the target database against the corresponding portion of the source database, the variability of the source database content, and the random number generator. The modified source database may include second records and second fields. The source database and the modified source database may differ in at least one of records or fields.

Other embodiments of this aspect include corresponding computer systems, apparatus, and computer programs recorded on one or more computer storage devices, each configured to perform the actions of the methods.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-implemented method for testing instructions the method comprising:
   receiving, from a storage, first database instructions comprising:
   first extraction instructions configured to extract source content,
   first transform instructions configured to transform the extracted source content, and
   first load instructions configured to load the transformed source content as target content;
   generating, in a memory of a computing system and from sampling, via a random number generator, a source database description and a target database description, a source database framework and a target database framework;
   receiving first test information, wherein the first test information describes source database content and variability of the source database content;
   generating, based on:
   the source database framework,
   the first test information, and
   the random number generator,
   a source database, wherein the source database comprises first records and first fields, and wherein the generating the source database comprises sampling, via the random number generator, the first test information to generate the first records;
   generating, based on:
   the source database,
   the first database instructions, and
   the target database framework,
   a target database comprising target records and target fields;
   validating at least a portion of the target database against a corresponding portion of the source database; and
   generating, based on:
   a successful validation of the at least the portion of the target database against the corresponding portion of the source database,
   the variability of the source database content, and
   the random number generator,
   a modified source database,
   wherein the modified source database comprises second records and second fields,
   wherein the generating the modified source database comprises sampling, via the random number generator, the first test information to generate the second records, and
   wherein the source database and the modified source database differ in at least one of records or fields.

2. The computer-implemented method of claim 1, wherein the source database differs from the modified source database in quantities of records.

3. The computer-implemented method of claim 1, wherein the source database differs from the modified source database in values in respective records.

4. The computer-implemented method of claim 1, wherein the source database differs from the modified source database in quantities of fields.

5. The computer-implemented method of claim 1, wherein the source database differs from the modified source database in types of fields.

6. The computer-implemented method of claim 1, wherein the validating comprises:
   comparing a quantity of the first records of the source database with a quantity of target records of the target database,
   wherein generating the modified source database is further based on the comparison of the quantity of the first records of the source database with a quantity of target records of the target database.

7. The computer-implemented method of claim 1, wherein the validating comprises:

comparing values between:
  a selected field of a record of the first records of the source database with
  a corresponding field of a corresponding record of the target records of the target database,
wherein generating the modified source database is further based on the comparison of the selected field and the corresponding field.

8. The computer-implemented method of claim 1, further comprising:
validating at least a second portion of the target database against a corresponding second portion of the source database;
generating, based on a failed validation of the at least the second portion of the target database against the corresponding second portion of the source database, an indication of the failed validation; and
receiving, based on the generation of the indication of the failed validation, modified first extraction instructions.

9. The computer-implemented method of claim 8, further comprising:
outputting the indication of the failed validation with the at least the second portion of the target database and the corresponding second portion of the source database.

10. The computer-implemented method of claim 8, further comprising:
generating, based on:
  the modified source database,
  the first database instructions, and
  target database framework,
  a modified target database comprising modified target records and modified target fields;
validating at least a portion of the modified target database against a corresponding portion of the modified source database; and
outputting a result of a validation of the at least the portion of the modified target database against the corresponding portion of the modified source database.

11. An apparatus comprising:
one or more processors; and
memory storing instructions that, when executed by the one or more processors, cause the apparatus to:
  receive, from a storage, first database instructions comprising:
    first extraction instructions configured to extract source content,
    first transform instructions configured to transform the extracted source content, and
    first load instructions configured to load the transformed source content as target content;
  generate, in a memory of a computing system and from sampling, via a random number generator, a source database description and a target database description, a source database framework and a target database framework;
  receive first test information, wherein the first test information describes source database content and variability of the source database content:
  generate, based on:
    the source database framework,
    the first test information, and
    the random number generator,
    a source database, wherein the source database comprises first records and first fields, and wherein the instructions to generate of the source database cause the apparatus to sample the first test information to generate the first records;
  generate, based on:
    the source database,
    the first database instructions, and
    the target database framework,
    a target database comprising target records and target fields;
  validate at least a portion of the target database against a corresponding portion of the source database; and
  generate, based on:
    a successful validation of the at least the portion of the target database against the corresponding portion of the source database,
    the variability of the source database content, and
    the random number generator,
    a modified source database,
  wherein the modified source database comprises second records and second fields, and
  wherein the instructions to the generate the modified source database cause the apparatus to sample the first test information to generate the second records.

12. The apparatus of claim 11, wherein the source database differs from the modified source database in quantities of records.

13. The apparatus of claim 11, wherein the source database differs from the modified source database in values in respective records.

14. The apparatus of claim 11, wherein the source database differs from the modified source database in quantities of fields.

15. The apparatus of claim 11, wherein the source database differs from the modified source database in types of fields.

16. The apparatus of claim 11, wherein the instructions to validate further cause the apparatus to:
compare a quantity of the first records of the source database with a quantity of target records of the target database,
wherein the generation the modified source database is further based on the comparison of the quantity of the first records of the source database with a quantity of target records of the target database.

17. The apparatus of claim 11, wherein the instructions to validate further cause the apparatus to:
compare values between:
  a selected field of a record of the first records of the source database with
  a corresponding field of a corresponding record of the target records of the target database,
wherein generating the modified source database is further based on the comparison of the selected field and the corresponding field.

18. The apparatus of claim 11, wherein the instructions further cause the apparatus to:
validate at least a second portion of the target database against a corresponding second portion of the source database;
generate, based on a failed validation of the at least the second portion of the target database against the corresponding second portion of the source database, an indication of the failed validation; and
receive, based on the generation of the indication of the failed validation, modified first extraction instructions.

19. The apparatus of claim 18, wherein the instructions further cause the apparatus to:
output the indication of the failed validation with the at least the second portion of the target database and the corresponding second portion of the source database.

20. One or more non-transitory media storing instructions that, when executed by one or more processors, cause the one or more processors to perform steps comprising:
- receiving, from a storage, first database instructions comprising:
  - first extraction instructions configured to extract source content,
  - first transform instructions configured to transform the extracted source content, and
  - first load instructions configured to load the transformed source content as target content;
- generating, in a memory of a computing system and from sampling, via a random number generator, a source database description and a target database description, a source database framework and a target database framework;
- receiving first test information, wherein the first test information describes source database content including:
  - a quantity of records,
  - a quantity and types of fields, and
  - variability of the source database content;
- generating, based on:
  - the source database framework,
  - the first test information, and
  - the random number generator,
  a source database, wherein the source database comprises first records and first fields, and wherein the generating the source database comprises sampling, via the random number generator, the first test information to generate the first records;
- generating, based on:
  - the source database,
  - the first database instructions, and
  - the target database framework,
  a target database comprising target records and target fields;
- validating at least a portion of the target database against a corresponding portion of the source database; and
- generating, based on:
  - a successful validation of the at least the portion of the target database against the corresponding portion of the source database,
  - the variability of the source database content, and
  - the random number generator,
  a modified source database,
- wherein the modified source database comprises second records and second fields,
- wherein the generating the modified source database comprises sampling, via the random number generator, the first test information to generate the second records, and
- wherein the source database and the modified source database differ in at least one of records or fields.

* * * * *